United States Patent [19]

Wilkes et al.

[11] 4,108,775
[45] Aug. 22, 1978

[54] CARTRIDGE FILTER

[75] Inventors: Robert D. Wilkes; Alan H. Peters, both of Little Rock, Ark.; Virgil J. Jacuzzi, Islington, Canada

[73] Assignee: Jacuzzi Bros. Inc., Little Rock, Ark.

[21] Appl. No.: 789,699

[22] Filed: Apr. 21, 1977

[51] Int. Cl.² .............................................. E04H 3/20
[52] U.S. Cl. .................... 210/169; 210/282; 210/299; 210/309; 210/440; 210/442; 210/453
[58] Field of Search ............... 210/169, 282, 299, 308, 210/309, 440, 442, 443, 447, 448, 453, 455

[56] References Cited
U.S. PATENT DOCUMENTS

| | | | |
|---|---|---|---|
| 528,652 | 11/1894 | Bowden | 210/443 X |
| 2,210,213 | 8/1940 | Long | 210/440 |
| 2,471,069 | 5/1949 | Le Clair | 210/299 |
| 2,736,435 | 2/1956 | Gardes et al. | 210/282 |
| 3,012,676 | 12/1961 | Englesberg | 210/443 X |

Primary Examiner—Ferris H. Lander
Attorney, Agent, or Firm—Hill, Gross, Simpson, Van Santen, Steadman, Chiara & Simpson

[57] ABSTRACT

A cartridge filter unit particularly adapted for use in a swimming pool water purification system because of its modular design, includes a readily accessible filter body. By removing a cover, a core assembly including a solids entrapping device and an inexpensive, disposable filter cartridge contained therein may be easily withdrawn for cleaning or replacement without allowing solid pollutants collected by the filter to re-enter the system.

13 Claims, 10 Drawing Figures

CARTRIDGE FILTER

BACKGROUND OF THE INVENTION

1. Field of the Invention

This invention relates to filter units for use in a swimming pool water purification system and particularly to filter units which incorporate a disposable filter media in cartridge form.

2. Description of the Prior Art

The use of a filtering device to remove impurities from swimming pool water on a continuous basis has long been known.

One such filter unit utilizes a support surface made of a porous material on which a coating of diatomaceous earth is applied by adding the diatomaceous earth to water entering the filter unit. The diatomaceous earth forms a filter media over the porous support surface and collects solid impurities as water flows therethrough. Upon the coating of diatomaceous earth becoming contaminated with sufficient solids, the support surface is removed and sprayed with a typical garden hose to wash the diatomaceous earth therefrom. Another application of diatomaceous earth is then applied in the similar manner noted above.

Another type of filter in common use today includes a tank in which various grades of gravel and sand have been built up in progressive layers to form a filter media. As swimming pool water is circulated through this type of filter, solid impurities collect within the filter media. Such a filter is cleaned by backwashing or reversing the direction of flow through the filter which dislodges the collected solids which are then discharged into a municipal sewer or allowed to drain out on the swimming pool owner's lawn.

A third type of filter includes a tank having a readily removable cover providing access to a plurality of nonwoven polyester fiber filter modules. The number of filter modules within a particular tank is dependent on the volume or capacity of swimming pool water to be filtered in a particular time period. Each filter module is constructed of a nonwoven polyester fiber hermetically sealed at each end with noncorrosive urethane end caps.

Another filter unit utilizing a cartridge filter element for commercial and residential swimming pools includes a tank in which there are three cartridges comprising a filter media of a pleated material of polyester and cotton fibers reinforced with a cellulose mixture.

In still another filter unit designed to utilize a filter cartridge in which water enters a filter tank through a bottom inlet and flows upwardly about a filter cartridge having a pleated filter media made of a fabric. Water flows through the pleated media entrapping suspended solids on the surface of the fabric while allowing the resultant filtered water to travel down a center core of the cartridge and out of a bottom discharge.

A further cartridge filter according to U.S. Pat. No. 3,988,244 has a dome-shaped cover removably sealed to a base. The base includes an inlet which directs swimming pool water up a hollow center portion of a pleated filter element. The filter element is cylindrically-shaped and has a porous center collection core within the element. The collection core allows water to flow from inside and outside of the filter element to the collection core and to flow downwardly to pass therefrom to a discharge located in the base.

Replacement filter cartridges are available including a pleated filter media and a rigid center core to prevent bending or deforming of the cartridge in the middle which may allow internal bypassing of the filter media.

Nevertheless, improvements in such filters are still desirable. For example, there has been need for a simple, easily cleanable filter construction especially adapted for swimming pool use which will prevent solids not held on the filter medium from entering the water circulation system when the filter is being serviced for cleaning or replacement of the filter medium. Another area of desirable improvement is to simplify the selective use of from one to a plurality of similar units in any given system depending upon the filtration capacity requirements rather than simply providing a larger unit when greater capacity is needed.

SUMMARY OF THE INVENTION

A cartridge filter of this invention includes a base in which are located dual inlet ports and discharge ports. By providing a filter body with a dual set of inlet ports and discharge ports, additional filter units may be added to provide the filter system which may be adapted readily to varying sized pools by merely adding additional filter units.

To obtain best results, a filtering system for a swimming pool should circulate the water such that a complete volume of the swimming pool has been circulated within an 8-hour period. The filter unit as disclosed by this invention provides for a flow rate proximating 25 gallons per minute so as to provide complete filtration for a swimming pool containing approximately 12,000 gallons. As an example, a rectangular-shaped swimming pool having the dimensions of 16 feet wide by 32 feet long by an average of 5 feet deep would have a volume on the order of 18,000 gallons and as such would require two such filter units as disclosed herein and which may conveniently be placed in series.

Above the base of the filter body is a cylindrical-shaped cartridge portion which is in turn closed by a conical-shaped cover.

Within the filter body is a rod center post having an upper threaded end portion which extends through the cover and has threadedly secured thereto a suitable cover retaining handle knob. At its lower end the post is attached to a coupling assembly which connects with a T-fitting including a horizontal discharge passage which provides two discharge ports from the filter.

About the center post is a tubular core assembly which includes an elongate perforated core tube having about its bottom end a solids entrapping cup. The perforated core has a closed top and an open bottom which is received about the coupling assembly. About the elongate core is positioned a disposable filter cartridge made of a corrugatedd filter media.

If only one filter unit is to be utilized, one of the inlet ports and one of the discharge ports is conveniently closed by inserting a respective plug therein. The other inlet port communicates with the discharge from a circulation pump while the discharge port of the filter unit returns the filtered water to the swimming pool.

During operation, water is drawn from the swimming pool by the pump and pumped into the filter inlet port where it passes upwardly and about an outer surface of the filter cartridge. Water passes through the filter cartridge while suspended solids and immiscible liquids and greases collect on the outer surface of the filter media. Filtered water flows through the perforations of the core and then downward within the core.

The lower end center post coupling has an annular series of elongate channels allowing the filtered water to pass therethrough and a bottom portion of the coupling and into the discharge passage of the T-fitting and thence from the unplugged discharge port.

As solids and other pollutants collect on the filter media, pressure of the water between the pump and the filter media increases and this pressure may be conveniently determined by a pressure gauge mounted on the conically shaped cover. Upon the gauge registering a certain back pressure, it will be evident that the filter cartridge should be cleaned.

Cleaning is accomplished by deenergizing the pump, disengaging the handle knob from the upper end of the center post and removing the cover from the filter body.

A convenient handle bale has been provided on the upper end of the perforated core facilitating withdrawal of the core and the filter cartridge attached thereto. During this withdrawal process, any solids and/or pollutants not adhering to the filter media, but falling therefrom, collect within the solids collecting cup formed about the bottom of the core assembly. The collection cup prevents the separated, loose pollutants from returning to the swimming pool.

When more than one filter is to be utilized, the filter units may be conveniently cooperatively connected by preformed connecting tubes which are inserted in the adjacent aligned inlet and discharge ports of the units. After insertion of the connecting tubes, the filter units may be conveniently joined together by means of a connecting clip structure attached to opposite sides of the adjoining bases of the filter units. A dress cap is then available to cover the connecting tubes and is supported by the clips.

A pump mounting bracket may be conveniently secured to the base of the filter unit so as to provide an integral assembly of the pump and the filter unit. With the location of the pump and the filter fixed, the various plumbing components connecting the pump to the filter can be predetermined and supplied in kit form.

There are several advantages gained from the swimming pool purification system and cartridge filter of the present invention. Because of the modular construction, additional filter units may be conveniently added and cooperatively connected battery relation so that additional filtration capacity may be easily achieved. The filter units may be conveniently secured together and a pump connected thereto by precut and predetermined fittings supplied in kit form. This is possible because the physical relationship between filter units and the pump has been predetermined by means of the connecting clips and the pump mounting base.

The structure of the filter unit itself also provides several advantages over prior filter units and particularly filter units incorporating a filter cartridge or element. As has already been noted, prior filter cartridges or elements have integral therewith a rigid center core to prevent the cartridge from deforming or bending under pressure. As an example, it was found that without a rigid support core within a filter cartridge, the cartridge would collapse when the pressure differential of the water between the inside and outside of the filter media was about 17 psi. Therefore, to allow higher operating pressure and avoid almost continuous cleaning, it has been deemed necessary heretofore to furnish a filter element or cartridge with an integral core and as such the cost of such a filter cartridge included this core element.

In the filter unit of the present invention, the core is a permanent structural element about which the cartridge is replaceably received and as such the filter cartridge does not include such a core and is therefore considerably less expensive than filter cartridges or elements having the integral core.

A further advantage of the structure of the cartridge filter of this invention is the provision of a solids entrapping device which may be conveniently formed as part of the permanent core. As the core assembly is withdrawn, any pollutants which do not adhere to the filter media or drop therefrom are entrapped by the cup and are withdrawn with the core assembly. The entrapped solids may be washed away at the same time that the filter cartridge is sprayed with a garden hose or the like to remove the solids collected on the filter media of the filter cartridge. Since it is desirable not to allow these pollutants to return to water within the swimming pool, providing such an entrapping device is particularly advantageous to a swimming pool owner.

DESCRIPTION OF THE PREFERRED EMBODIMENTS

A cartridge filter units 10 according to the present invention comprises (FIGS. 1-4) a base 12 which carries a hollow, vertically, elongated, cylindrically-shaped, tubular casing body portion 14. Closing an open top end 16 of the body portion 14 is a preferably conically-shaped cover 18 whereby to enclose a filter chamber 19.

Figures 3, 5, 6:
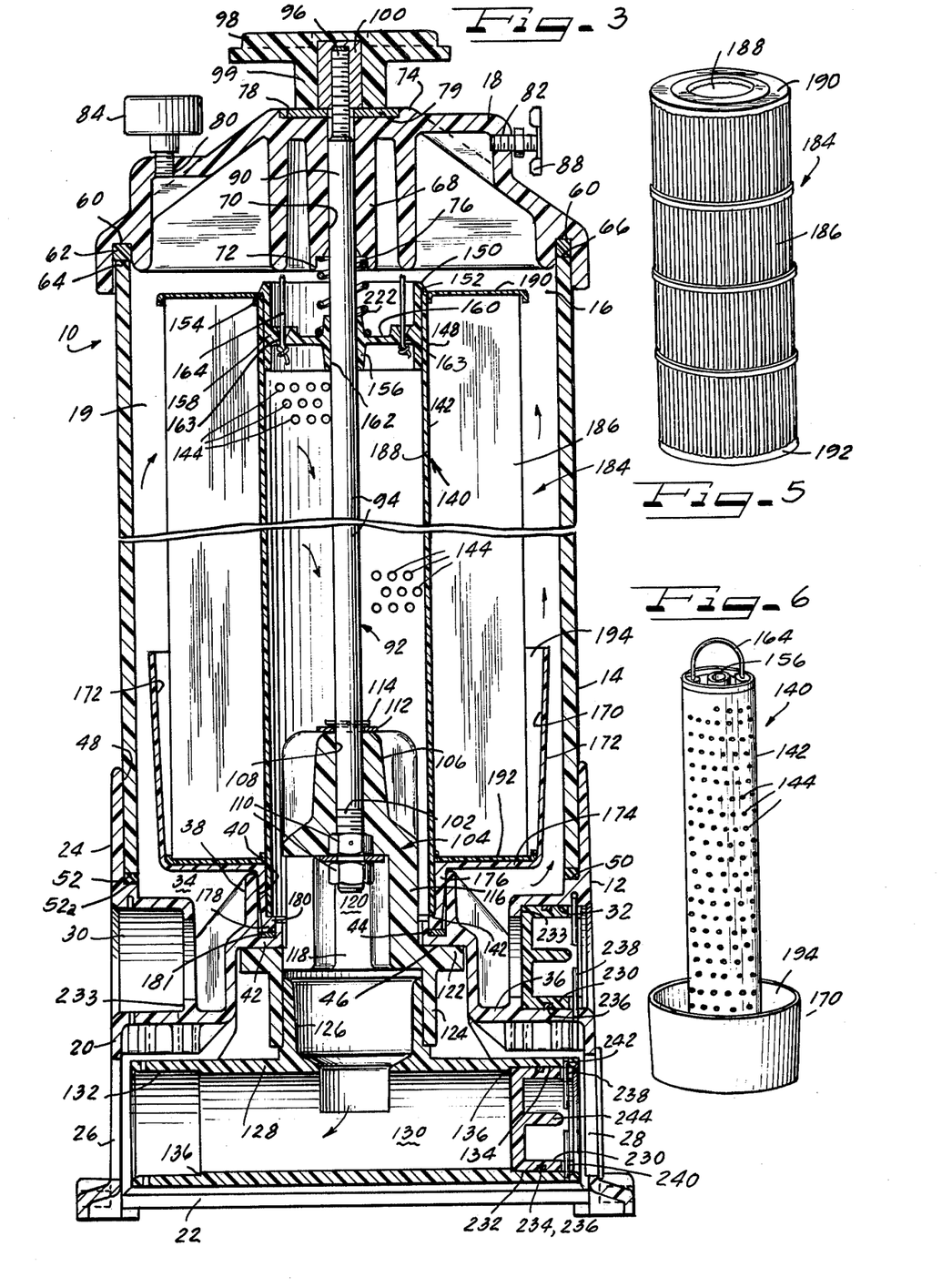
FIG. 3 is a fragmental vertical sectional elevational view taken substantially along the line III-III in FIG. 2.
FIG. 5 is a perspective view of the filter cartridge for use in the cartridge filter of FIGS. 1-4.
FIG. 6 is an elevational perspective view of the core assembly with an entrapping cup as utilized in the cartridge filter of FIGS. 1-4.
Figure 4:
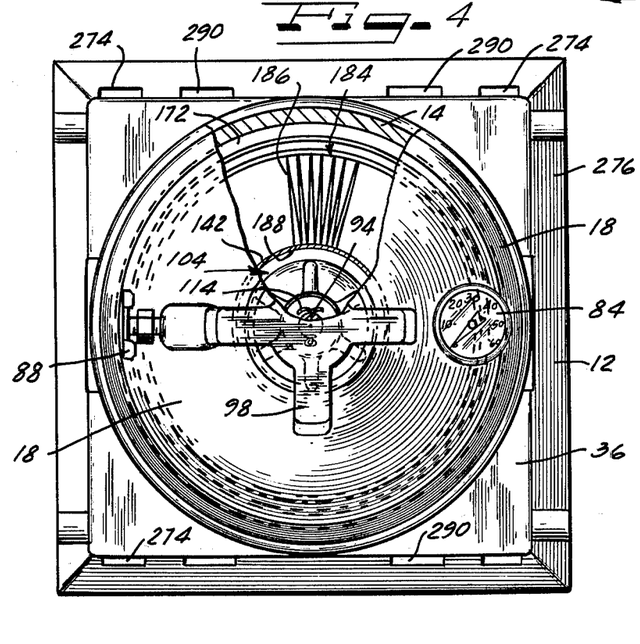
FIG. 4 is a top plan view of the cartridge filter partially broken away to show the corrugated filter media below.

The base 12 as well as other parts, as shown, may be formed by molding or extrusions from suitable substantially rigid plastic material. In a desirable construction, the base 12 is divided into a lower preferably rectangular portion 20 having an open bottom 22 and an upper cylindrically-shaped portion 24. The bottom portion 20 contains two horizontally aligned discharge openings 26 and 28 respectively positioned on opposite sides of the lower portion 20. Vertically above the discharge openings 26 and 28 are two horizontally aligned recessed inlet ports 30 and 32 providing access to an inner space 34 defined above a horizontal partition 36 and between the upper portion 24 and a smaller diameter central hollow hub portion 38 projecting upwardly from the partition 36. The hub portion 38 is disposed about a central opening through the portion 36 and has an upper collar socket opening 40 within the lower portion of which is a radially inwardly extending annular flange 42 formed with an upper annular groove 44 and a bottom shoulder surface 46.

On the inner surface 48 of the upper portion 24 adjacently above the inlet ports 30 and 32 is formed an annular upwardly facing supporting seat ledge 50 for a bottom edge 52 of the body portion 14 and an intervening sealing gasket 52a.

The cover 18 has a marginal annular downward groove 60 in which is located a gasket 62 to form a releasable seal 64 with a top edge 66 of the body portion 14. Integrally formed as part of the cover 18 is a centrally locatd downwardly projecting sleeve 68 having a vertical bore 70 therethrough. In a bottom end surface 72 on the sleeve 68 is formed a downward circular recess 76 and in a crown surface 74 of the cap about the upper end of the bore 70 is formed a recess 78 in which is seated a thrust plate 79 (See FIG. 3). The cover 18 further includes a first threaded aperture 80 for attaching the threaded stem of a pressure gauge 84 and a second threaded aperture 82 for attachment of the threaded stem of an air release petcock 88.

Within the vertical bore 70 in the sleeve 68 is disposed an upper portion 90 of a post assembly 92 comprising an elongated rod 94 having a threaded top end portion 96 projecting above the crown 74 for attachment to a knob handle 98 designed for manual manipulation. The handle 98 includes a depending hub 99 equipped with a fixed axial tapped downwardly opening brass bushing 100 within which the rod portion 96 is threadedly engaged.

The rod 94 extends axially vertically within the body portion 14 and has a bottom threaded end portion 102 engaged with a coupling member 104. A top portion 106 of the member 104 is of vane rib reinforced generally conical form and has a central bore 108 to receive the bottom threaded end portion 102 therethrough. The rod 94 is secured to the member 104 between nuts 110 and a washer 111 at the lower end of the rod and a washer 112 and a cotter pin 114 carried by the rod 94 at the upper end of the member 104.

The member 104 includes an intermediate hollow cylindrically-shaped portion 116 to extend upwardly through the central opening in the partition 36, and having an annular series of elongate vertical slots 118 which provide an entrance passage means into a hollow downwardly opening chamber 120.

At the lower end of the chamber 120 the portion 116 has a radially outwardly extending flange 122 providing a shoulder ledge engaged with the shoulder 46 of the base 12. A downwardly extending sleeve flange portion 124 projects from the flange 122 and has a vertical central hollow leg portion 126 of a T-shaped tubular discharge fitting 128 engaged and hermetically sealed therein.

The T-shaped discharge fitting 128 has a connecting horizontal discharge passage 130 which provides a first and second discharge port 132 and 134 at the respective opposite ends thereof. The discharge ports 132 and 134 have a larger diameter than an inner part of the passage and each provides an offsetting shoulder 136 at its inner end.

The filter body 10 also has mounted therein a core assembly 140 comprising a hollow elongate cylindrically-shaped rigid tubular core member 142 having an array of perforations 144 (FIGS. 3 and 6) to allow access into a central hollow space 146. A top 148 of the core member 142 is closed by a core cap 150 having a top radially outwardly extending annular rim 152 engaging a top edge 154 of the core member 142. The cap 150 also includes an inner hub sleeve 156 supported by an outer sleeve portion 158 of the cap 150 through a connecting integral partition 160. The inner sleeve 156 has a vertical center bore 162 through which the rod 94 extends slidably. The partition 160 has at diametrically opposite sides apertures 163 to connect knotted end portions of a handle bale loop 164 which may be formed from cord. At the lower end of the core member 142 is a solids collection cup 170 having a radially outer circular upstanding wall 172, a flat horizontal annular bottom wall 174 and a hollow centrally located and downwardly extending flange hub flange 176. About the bottom edge 178 of the hub flange 176 is a radially inwardly extending annular shoulder 180 providing supporting ledge surface for the lower edge of the core member 142 which is secured in hermetically sealed telescoped relation in the hub flange 176. In the assembly, the lower end of the hub flange 176 is received in the groove 44 at the base of the upwardly opening socket provided by the hub portion 38 on a sealing gasket 181.

Assembled about the core member 142 is a filter cartridge 184 (FIGS. 3, 4 and 5) formed by pleating a synthetic filter cloth, paper or media 186 and forming such into a cylindrically-shaped configuration having an inner circular opening 188 selectively sized to fit snugly about the perforated core member 142. The filter cartridge 184 has respective flat top and bottom disk-shaped ends 190 and 192 formed as molded plastic parts and fixed to the ends of the impregnated pleated media 186 in an integral filter cartridge.

The diameter of the cup 170 is differently larger than the diameter of the filter cartridge 184 so that a solids collection space 194 is formed therebetween. Upon withdrawal of the core assembly 140 and the filter cartridge 184 carried by the bottom wall 174 of the cup 170, any particulate or other material which may not have been caked on the filter cartridge 184 and settled down in the cup 170 or which may have collected on the outer surface of the filter media 186 but does not adhere to the filter media 186 during the removal procedure and falls within the space 194 into the cup will be removed for cleaning from the system. Thus, the loose foreign matter will not inadvertently be returned to the swimming pool through the opening 40 which is uncovered by the withdrawal of the core assembly 140.

Figures 7, 8, 9, 10:
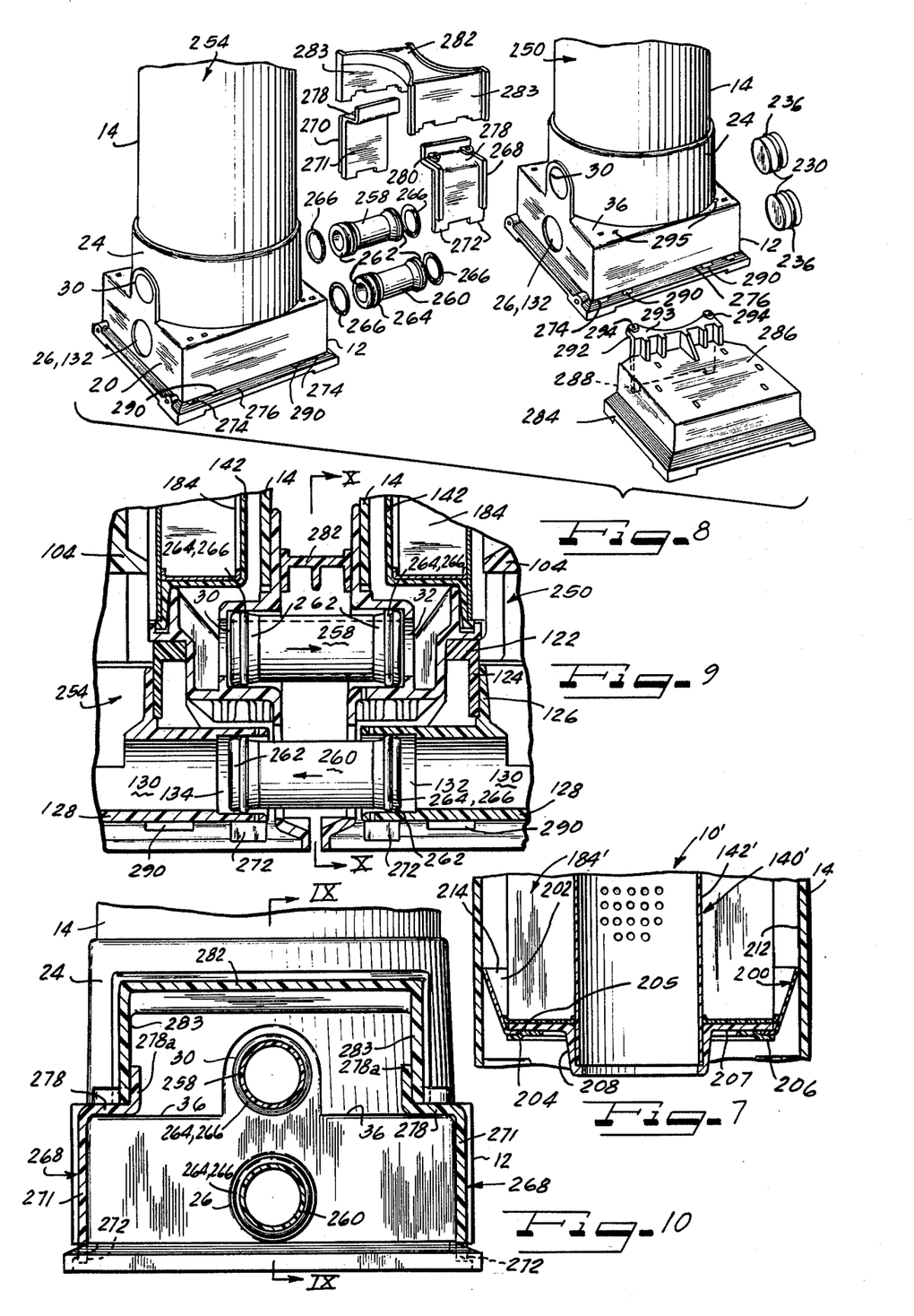
FIG. 7 depicts a modified solids entrapping means carried at the bottom end of the core assembly.
FIG. 8 is a fragmentary exploded detail view of a plurality of the cartridge filters and means for assembling them cooperatively into a filtration system.
FIG. 9 is a sectional detail view through the base portion of the cartridge filter assembly substantially along the line IX—IX in FIG. 10.
FIG. 10 is a sectional detail elevational view substantially along the line X—X in FIG. 9.

As best seen in FIG. 7 a modified configuration of a particulate entrapping means 200 includes an entrapping cup member 202. This member 202 is made of a resilient low durometer material and has an outer circular upstanding lip of sufficient diameter to engage the inner surface of the body portion 14. The member 202 has a bottom annular flange 204 which interfaces with an offset 205 in a clamping ring 206 bonded to the bottom of an annular flange 207 on which the filter cartridge 184′ is supported and which has a depending sleeve hub flange 208 in which the lower end portion of the rigid core member 142′ is secured.

When the core assembly 140' is inserted within the body portion 14 of the filter 10', the member 202 extends outwardly and upwardly to wipe against the inner wall surface 212 of the body portion 14. The member 202 is sufficiently resilient to allow upward passage of water around the member 202 but forms a solids entrapping sump space 214 when the core assembly 140' and the filter cartridge 184' are being withdrawn for cleaning or replacement and the lip of the member wipes the inner surface of the wall surface 212 to direct pollutants into the sump space.

The construction relationship of parts in the filter unit 10 are such as to facilitate quick, easy and efficient assembly. Thus, having reference to FIG. 3, a preassembly may be effected of the T-fitting 128 with the coupling member 104 and of the post assembly 92 with the coupling 104. This preassembly may then be inserted through the bottom opening 22 in the base 12, carefully aligning the ports 132 and 134 of the T-fitting with the openings 26 and 28 in the base. Prior to or after such assembly, the body portion 14 is assembled with the base 12. If preferred, the coupling flange 122 may be permanently secured to the shoulder 46 of the base by means of a suitable bonding agent, although on the other hand it may be preferred to rely upon eventual take-up by means of the handle 98 to attain a tight joint at this point. Then, the core asesembly 140 carrying the filter cartridge 184 is adapted to be assembled by inserting it through the open upper end 16 into the body portion 14, engaging the at this time free upper end of the post 94 through the bore 162 in the hub 156 and engaging the lower end hub flange 176 in the socket provided within the collar opening 40 in the base structure. Next, a coiled helical compression spring 222 is engaged about the post rod 94 to thrust at its lower end against the core cap partition 160, with the lower end portion of the spring maintained concentric about the upwardly projecting portion of the inner sleeve 156. Upon placing the cover 18 in position over the upper end of the body portion 14, the upper end portion 90 of the post rod is received through the bore 70 in the sleeve portion 68 of the cover and the margin of the cover carrying the gaskets 62 is engaged upon the upper edge of the body member 14. Threading of the handle 98 onto the upwardly projecting threaded portion 96 of the post rod completes locking of the assembly into a unit by thrusting of the lower end of the hub 99 against the thrust plate 79 and thereby pressing the cover 18 downwardly while drawing the base 12 and the body portion 14 upwardly through the coupling 104 and compressing the spring 22 to maintain a downward bias on the core assembly 140.

Although the filter unit 10 is desirably constructed in generally modular form to permit a series of the filter units to be connected for large volume swimming pool circulation system use, where the filter unit is to be used alone for pool sizes of for example about 12,000 gallons capacity, means are provided for blocking one of the dual inlet ports 30 or 32 and one of the dual discharge ports 132 and 134. For this purpose such ports are constructed and equipped with respective entrance sockets to receive a respective preformed plug 230. By way of example, in FIG. 3 respective ones of the plugs 230 are shown as inserted in blocking relation into respectively the inlet port 32 and the discharge port 134. Each of the plugs 230 comprises a generally cup-shaped body 232, the base end of which is adapted to be bottomed against a shoulder 233 in the base inlet port, and the shoulder 136 in the T-member outlet port. A circumferential groove 234 in each of the plug carries an O-ring 236 to provide a sealed joint between the plug and the wall of the port in which the plug is received. To lock the plug 233 in place in each instance, an expansile locking ring 238 has generally radially extending locking ends 240 which are adapted by compression of the ring to be cleared into the mouth end of the associated port and then upon expansion of the ring to engage in respective sockets 242 in the wall defining the port whereby to lock the plug against being blown from the blocked port. Removal of the plugs is easily effected by compressing the associated locking ring to disengage the locking ends 240 from the sockets 242 and then grasping a transversely positioned reinforcing and handle rib 244 and pulling the plug 233 from the port.

Figure 1:
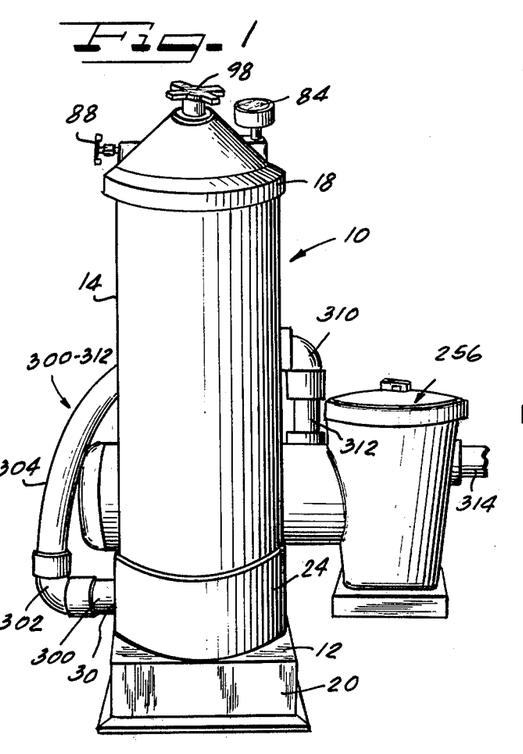
FIG. 1 is an elevational view of a cartridge filter embodying features of the present invention and its related pump.
Figure 2:
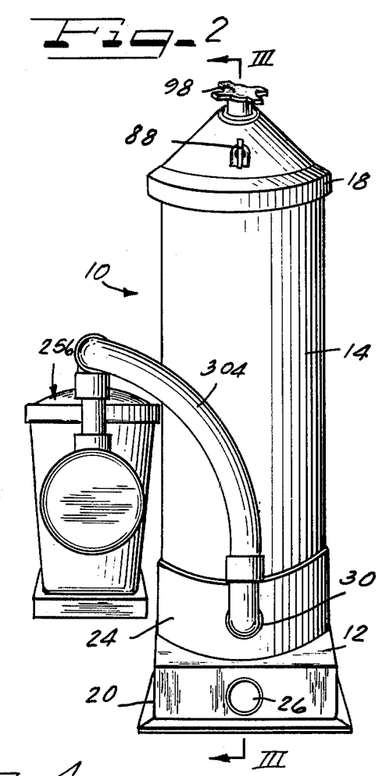
FIG. 2, like FIG. 1, is an elevational view of the cartridge filter and its related pump but looking toward the left side of FIG. 1.

If it is desired to employ a battery of the filter units 10, the arrangement generally illustrated in FIGS. 8–10 may be employed. For this purpose one of the filter units may be identified as the first filter unit 250 and a second filter unit, by way of example, may be identified as 254. The first unit 250 may have its ports 32 and 134 plugged by means of the plugs 230. The second filter unit 254 may be connected through its inlet port 30 to a pump 256 as shown in FIGS. 1 and 2, to receive water to be filtered from an associated swimming pool, and the discharge port 132 of the second filter unit will be connected by suitable conduit (not shown) with the filtered water inlet of the associated swimming pool. It will be appreciated, of course, that although the description will relate to a pair of the filter units in battery relation, any number of the filter units may be employed in series as may be necessary or desirable.

Series connection of the filter units 250 and 254 is conveniently effected by means of an inlet connecting tube 258 and an outlet connecting tube 260. Both of the tubes 258 and 260 may be of substantially similar generally dumbbell shaped construction having elongate tubular body portions provided at their opposite ends with enlargements dimensioned to be received in the entrance sockets in the aligned inlet and outlet ports, respectively, of the joined filter units. Each of the end enlargements 262 has a circumferential seal groove 264 within which is engaged a sealing O-ring 266 adapted to make sealing engagement with the wall defining the entrance sockets of the associated ports. As best visualized in FIG. 9, the tube 258 has its opposite ends respectively engaged in the inlet port 30 of the filter unit 250 and in the inlet port 32 of the filter unit 254. In like manner the connecting tube 260 has its opposite ends engaged in the outlet port 132 of the filter unit 250 and the outlet port 134 of the filter unit 254.

Means for connecting the two filter units 250 and 254 against inadvertent separation comprise connecting clips 268 and 270 which are desirably of identical construction, each having a vertical body portion provided with a pair of downwardly projecting lugs 272 adapted to be received in respective slots 274 in a ledge 276 formed on the lower end of the lower portion 20 of the base 12. Each of the clip bodies 271 is of a length to extend upwardly along the base portion 20 and is provided with a horizontal angular flange portion 278 to lie upon the adjacent external portion of the horizontal partition 36 (FIG. 10). Each of the horizontal flange portions 278 may have one or more apertured bosses thereon for receiving suitable fastening means such as screws (not shown) for securing the brackets fixedly to the platforms 36 of the adjoining filter units.

To provide a protective closure for the tubes 258 and 260, a dress cap member 282 may be provided dimensioned to fit neatly between the cylindrical portions 24 of the filter unit bases in bridging relation over the upper tube 258. At each opposite end, the cap member 282 has a depending flange portion 283 which engages upon the horizontal flange portion 278 of the underlying connecting clip 268 at the outer side of a respective upstanding inner end flange 278a on the flange 278.

In keeping with the modular concept, a pump base 284 may be provided having a flat platform 286 on which the pump 256 may be installed. For convenient connection with the base 12 of the selected filter unit, the base 284 may be provided at one side with depending attachment lugs 288 engageable in complementary socket apertures 290 in the ledge 276 of the filter unit base. In addition, an attachment bracket 292 integral with the pump base may have an attachment flange 293 provided with apertured ears 294 to engage upon the platform 36 for attachment thereto by means of suitable fasteners engaged through the ears 294 and into suitable fastener receiving holes 295 in the underlying portions of the partition 36.

As will be apparent, by connection of the pump 256 with the filter unit 254, water pumped from the associated swimming pool into the filter unit 254 will also circulate by way of the inlet connecting tube 258 into the filter unit 250. Then, filtered water from the filter unit 250 will pass by way of the discharge connecting tube 260 from the T-fitting passage 130 of the filter unit 250 into the T-fitting passage 130 of the filter unit 254 and mingle with the water filtered in the filter unit 254 and then leave the filter unit 254 for return to the swimming pool.

As represented in FIGS. 1 and 2, connection of the pump 256 to the filter unit is adapted to be effected by means of a nipple 300 suitably attached in communication with the inlet port 30 (or it may be the inlet port 32 if preferred) and which nipple is connected by means of an elbow 302 to a conduit 304 which connects with an elbow 310 and a nipple 312 attached to the pump 256. A suitable conduit 314 leads from the swimming pool outlet to the pump 256. It will be evident that the several components comprising the filter unit 10 or a plurality of such filter units, the pump 256 and the several connections and duct pieces are adapted to be furnished in kit form in a compact packed arrangement for shipment and handling to the use site, where all of the components are adapted to be readily assembled for use.

It will be understood that variations and modifications may be effected without departing from the spirit and scope of the novel concepts of this invention.

We claim as our invention:

1. A filter adapted for use in a swimming pool water purification system, comprising:
    a filter housing having inlet and discharge ports;
    a core assembly carried removably within said housing and including a hollow perforate core connecting with the discharge port,
    a coreless filter cartridge disposed on and about said perforate core with a readily disassemblable longitudinal sliding fit and having a filter media to filter water flowing from said inlet port through said filter and said core to said discharge port;
    said filter cartridge being adapted to be readily and inexpensively replaced inasmuch as said cartridge is without a core;
    and a cup-shaped pollutant trapping member secured fixedly in assembly with the lower end of said core and supporting said filter cartridge so that the assembly can be handled as a unit for removal and replacement with respect to the filter housing.

2. A filter adapted for use in a swimming pool water purification system, comprising:
    a hollow filter casing defining a filter chamber having an inlet and an outlet;
    a removable core assembly in said chamber comprising an elongate, perforate, hollow core having a closed top end and open bottom end communicating with said outlet;
    a pollutants collection cup having an annular bottom joined to said bottom end of said perforate core, and providing a pollutants entrapping receptacle;
    and a coreless tubular filter cartridge having end disks joined to an elongate pleated filter media;
    said cartridge and said disks engaged slidably removably about said perforate core with the lower end portion of said cartridge located in said cup;
    an outer peripheral surface of said cartridge lower end portion and said cup spaced to provide a collection space between said surface and said cup;
    said core assembly being removable from said filter chamber for cleaning and said filter cartridge being removable from said perforate core.

3. A filter of modular construction for use in a swimming pool water filtration system, comprising:
    a tubular upright filter body;
    a base supporting said body and including a lower portion formed with an open bottom having aligned first and second discharge openings respectively on opposite sides of said lower portion and an upper portion having an upright collar flange joined to and separated from said lower portion by a horizontal partition;
    first and second inlet ports in respectively opposite sides of said collar flange;
    a central upwardly projecting hub on said partition and having a central opening to provide communication through said partition;
    a tubular body portion sealably engaged at its lower end in said collar flange;
    a post assembly comprising an elongate rod post having a threaded top end portion and a coupling member having a top portion joined to a bottom end of said rod post and having generally vertical communication passage between the top of the coupling member and the interior of a downwardly projecting hollow sleeve flange;
    said coupling member having a radially outwardly extending annular flange between said top portion and said sleeve fitting flange;
    a T-fitting having a hollow vertical leg positioned in and secured to said sleeve flange and a horizontal body defining a discharge passage joined to said vertical leg, the ends of said horizontal body defining a first and a second discharge port aligned with openings in said lower base portion;
    said post assembly rod post extending upwardly through said tubular body and said coupling member top portion extending through said opening in said hub portion of said base and said horizontally extending flange interfacing with a shoulder surface on said hub;

an elongate, perforate, hollow core having a closed top with a central bore therein, and an open bottom;

pollutants entrapping recess means about the bottom end of said core;

a generally tubular filter cartridge having a center opening in which said elongate perforate core is disposed and with its lower end in said entrapping recess means;

handle means carried by said closed top to facilitate handling said core and filter assembly;

said rod post extending upwardly through said central bore in said closed top;

said open bottom of said core engaged in an upper extent of said hub portion of said base and thrusting toward an upwardly facing shoulder on said hub portion;

a removable cover having an annular downwardly opening groove to receive a top edge of said body portion in sealing relationship, and a depending central hub sleeve with a central bore therethrough;

a compression spring disposed about said rod and thrusting against the top of said core;

said rod post extending through said hub sleeve bore;

the upper end of said spring being compressively engaged by the lower end of said hub sleeve of the cover;

and a handle threadedly secured to the upper end of said rod, and having a hub thrusting against the crown of said cover;

said filter cartridge and core assembly, said coupling passages and said T-fitting providing a filtration flow path between said inlet and said outlet.

4. A filter according to claim 3, wherein said cover includes a pressure gauge threadedly secured in an aperture in said cover for providing an indication of pressure conditions within the filter, and an air release petcock threadedly secured in an aperture in said cover for purging air from the filter.

5. A filter according to claim 3, including plugs for plugging one of said inlet ports and one of said outlet ports, said plugs each comprising a generally cup-shaped body dimensioned to fit within the port to be plugged, each of the plugs having sealing means about its periphery to provide a sealed joint within the port in which the plug is received, each plug having a handle portion to facilitate manipulation of the plug; and retaining clip means cooperating with each plug and comprising a compressible resilient member having engaging terminals retainingly engaged in sockets formed in the base member at said ports.

6. A filter according to claim 3, wherein said pollutants entrapping recess means comprise a resilient cup having a lip projecting generally upwardly and engaging the inner surface of said body member.

7. A filter unit adapted for use in a swimming pool water purification system, comprising:
(a) a filter housing defining a vertical upwardly opening filtration chamber within a tubular body portion and having an inlet and an outlet communicating with the lower portion of said chamber;
(b) a core assembly removably carried within said chamber and including an elongate vertical hollow perforate core member having a closed top and open bottom in communication with said outlet;
(c) an elongate tubular filter cartridge mounted in liquid transfer relation about said core member;
(d) a removable cover for closing the open top of said chamber;
(e) the closed chamber providing a closed flow path from said inlet, through said filter cartridge, into said core member and to discharge from said outlet;
(f) entrapping means at the lower end of said core member under said filter cartridge to entrap pollutants which do not adhere to said filter cartridge, said entrapping means comprising a cup-shaped member having a radial bottom wall with an upwardly extending annular radially outer wall spaced from said filter cartridge and having an upper lip adjacent to the inner surface of said body portion and a radially inner annular downwardly extending central hub flange within which the lower end portion of said core member is secured in hermetically sealed telescoped relation, said entrapping means and said core member as a functionally integral assembly being removable from said chamber with said filter cartridge for removing the entrapped pollutants;
(g) a partition in said housing across said lower end portion of said chamber and separating said inlet located thereabove from said outlet located therebelow, said partition having a central opening therethrough about which an upwardly projecting hollow hub portion provides an upwardly opening annular socket concentric with said core assembly;
(h) and said hub flange of said entrapping member engaging removably in centered sealing engagement in said socket.

8. A filter unit according to claim 7, wherein said entrapping means member comprises a one-piece molding.

9. A filter unit according to claim 7, wherein said entrapping member outer wall is resilient and said lip engages with said inner surface of said body portion to scrape said inner surface upon upward removal of said core assembly from said chamber so that particulate pollutants not adherent to said filter cartridge are entrapped in said member and removed from said chamber.

10. A purification system for removing pollutants from water in a swimming pool, comprising:
a pump having means for communicating with a swimming pool outlet;
a battery of cooperatively related filter units wherein each unit has a first and second inlet port and a first and second discharge port in a base portion of the unit, with the first inlet port of one unit communicating in receiving relation with said pump and the first discharge port of said one unit adapted to return filtered water to the pool;
means connecting the first inlet port of another of said filter units with the second inlet port of said one unit;
means connecting the first discharge port of said another filter unit with the second discharge port of said one unit;
each of said filter units having filtering means therein;
sealing plugs blocking the second inlet port and second discharge port of said another filter unit so that filtering circulation is effected by way of said first inlet port of said one unit into said first filter unit and also by way of said second inlet port of said one unit into said another filter unit and all of the effluent from both of said filter units leaves through said first discharge port of said first filter unit;

said means connecting said first and second inlet ports comprising a coupling tube having opposite end portions carrying means for slidably sealingly engaging in entrance sockets in said ports;

and said means for connecting said first and second discharge ports comprising a similar coupling tube having opposite end portions carrying sealing means engaging slidably in entrance sockets in said discharge ports; means connecting said filter units together adjacent to said port connecting means so as to maintain said port connecting means in sealing engagement during operation.

11. A system according to claim 10, said connecting means comprising clips connecting said filter units together adjacent to said port connecting means, and a dress cap piece engaging with said clips.

12. A system according to claim 10, said connecting means comprising clips connecting said filter units together adjacent to said port connecting means, said filter unit base portions having lower end ledges provided with slots, and said clips having lugs received in said slots.

13. A filter unit adapted for use in a swimming pool water purification system, comprising:
(a) a filter housing defining a vertical upwardly opening filtration chamber and having an inlet and an outlet communicating with the lower portion of said chamber;
(b) a core assembly removably carried within said chamber and including an elongate vertical hollow perforate core member having a closed top and open bottom in communication with said outlet;
(c) an elongate tubular filter cartridge mounted in liquid transfer relation about said perforate core member;
(d) a removable cover for closing the open top of said chamber;
(e) the closed chamber providing a closed flow path from said inlet, through said filter cartridge, into said perforate core member and to discharge from said outlet;
(f) and entrapping means at the lower end of said core member under said filter cartridge to entrap pollutants which do not adhere to said filter cartridge, said entrapping means being removable from said chamber with said core member and said filter cartridge for removing the entrapped pollutants;
(g) said entrapping means comprising a resilient entrapping cup attached to the lower end of said core member and having an upwardly projecting lip engageable with an inner surface defining said chamber and providing an entrapping space about said filter cartridge so that particulate pollutants not adherent to said filter cartridge are entrapped in said cup and removed from said chamber upon removal of said core assembly from said chamber;
(h) said lip being adapted to wipe said inner surface to direct pollutants into said cup when said core assembly and filter cartridge are removed upwardly from within said filtration chamber.

* * * * *

UNITED STATES PATENT AND TRADEMARK OFFICE
CERTIFICATE OF CORRECTION

PATENT NO. : 4,108,775
DATED : August 22, 1978
INVENTOR(S) : Robert D. Wilkes; Alan H. Peters; Virgil J. Jacuzzi It is certified that error appears in the above-identified patent and that said Letters Patent are hereby corrected as shown below:

Column 2, line 54, correct the misspelling of --corrugated--.

Column 3, line 47, after "connected" insert --in--.

Column 5, line 21, correct the misspelling of --located--.

Column 6, line 22, after "extending" erase "flange" and insert --annular entering--.

Column 6, line 42, erase "differently" and insert --differentially--.

Column 10, claim 3, line 56, after "sleeve" erase "fitting".

Signed and Sealed this

Twenty-fifth Day of September 1979

[SEAL]

Attest:

Attesting Officer

LUTRELLE F. PARKER
Acting Commissioner of Patents and Trademarks